(12) United States Patent
Charnay et al.

(10) Patent No.: US 12,089,717 B2
(45) Date of Patent: Sep. 17, 2024

(54) APPLICATOR END PIECE HAVING A FRUSTOCONICAL PROFILE

(71) Applicant: L'OREAL, Paris (FR)

(72) Inventors: Patrick Charnay, Clichy (FR); Hui Zhang, Clichy (FR); Laurent Aubry, Clichy (FR)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 17/996,579

(22) PCT Filed: Mar. 3, 2021

(86) PCT No.: PCT/EP2021/055387
§ 371 (c)(1),
(2) Date: Oct. 19, 2022

(87) PCT Pub. No.: WO2021/213721
PCT Pub. Date: Oct. 28, 2021

(65) Prior Publication Data
US 2023/0218063 A1    Jul. 13, 2023

(30) Foreign Application Priority Data
Apr. 21, 2020 (FR) .................................. 2003968

(51) Int. Cl.
*A45D 34/04* (2006.01)
*A45D 40/26* (2006.01)
*B29D 99/00* (2010.01)

(52) U.S. Cl.
CPC ......... *A45D 34/046* (2013.01); *A45D 40/267* (2013.01); *B29D 99/0096* (2013.01); *A45D 34/045* (2013.01); *A45D 40/265* (2013.01)

(58) Field of Classification Search
CPC .. A45D 34/046; A45D 34/045; A45D 34/042; A45D 34/043; A45D 40/267; A45D 40/265; A45D 40/262; A45D 40/264; B29D 99/0096
USPC .................................................. 401/126–130
See application file for complete search history.

(56) References Cited

U.S. PATENT DOCUMENTS

| 5,059,195 | A  | * | 10/1991 | Gray ................... | A61B 17/1659 408/239 R |
| 7,882,610 | B2 | * | 2/2011 | Gratsias .............. | B29C 65/1635 29/524.1 |
| 8,042,554 | B2 | * | 10/2011 | Dumler .................. | A46B 9/021 15/187 |

(Continued)

FOREIGN PATENT DOCUMENTS

DE    20 2017 101 261 U1    7/2018

OTHER PUBLICATIONS

International Search Report issued May 10, 2021 in PCT/EP2021/055387, filed on Mar. 3, 2021, 3 pages.

*Primary Examiner* — David J Walczak
(74) *Attorney, Agent, or Firm* — Christensen O'Connor Johnson Kindness PLLC

(57) ABSTRACT

A device for packaging and applying a cosmetic product, of longitudinal axis X, the device having a container for containing the product and a stem connected by a first end to a gripping part and by a second end to an application element having an application head and an end piece mounted in a housing of the stem, the end piece having a frustoconical portion fitted in a complementary frustoconical space in the housing of the stem.

12 Claims, 6 Drawing Sheets

(56) References Cited

U.S. PATENT DOCUMENTS 10,477,942 B2* 11/2019 Badie ................... A45D 34/046
2017/0181524 A1* 6/2017 Thiebaut .............. A45D 34/045

* cited by examiner

[Fig. 1]
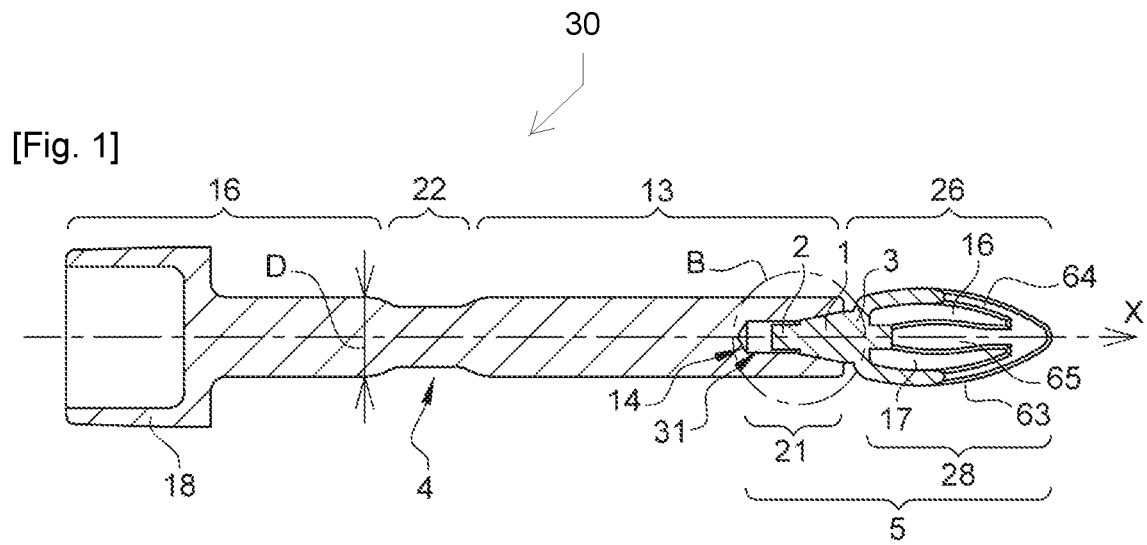
[Fig. 2]
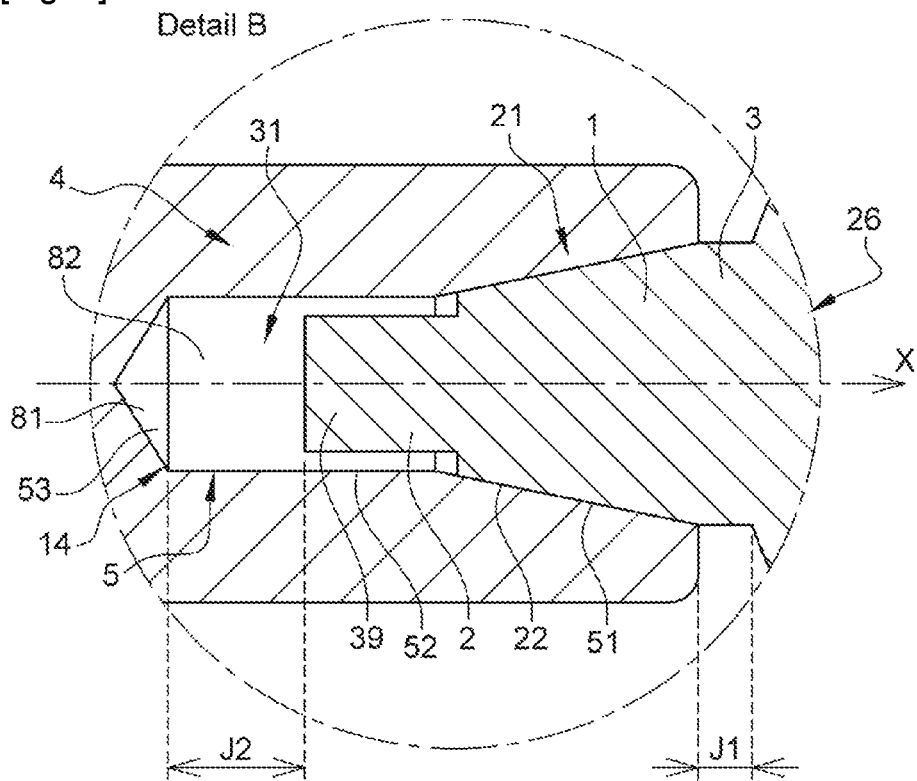

[Fig. 3]
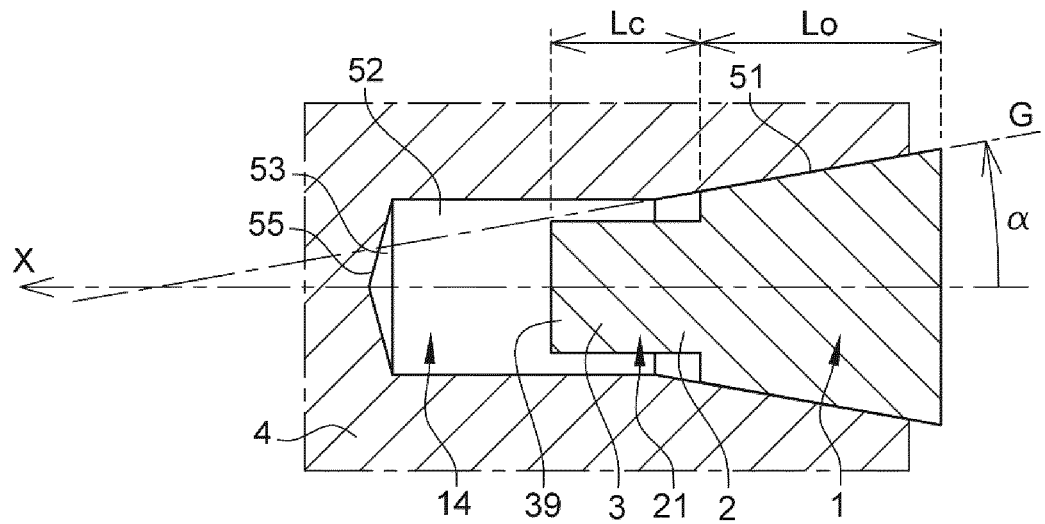
[Fig. 4]
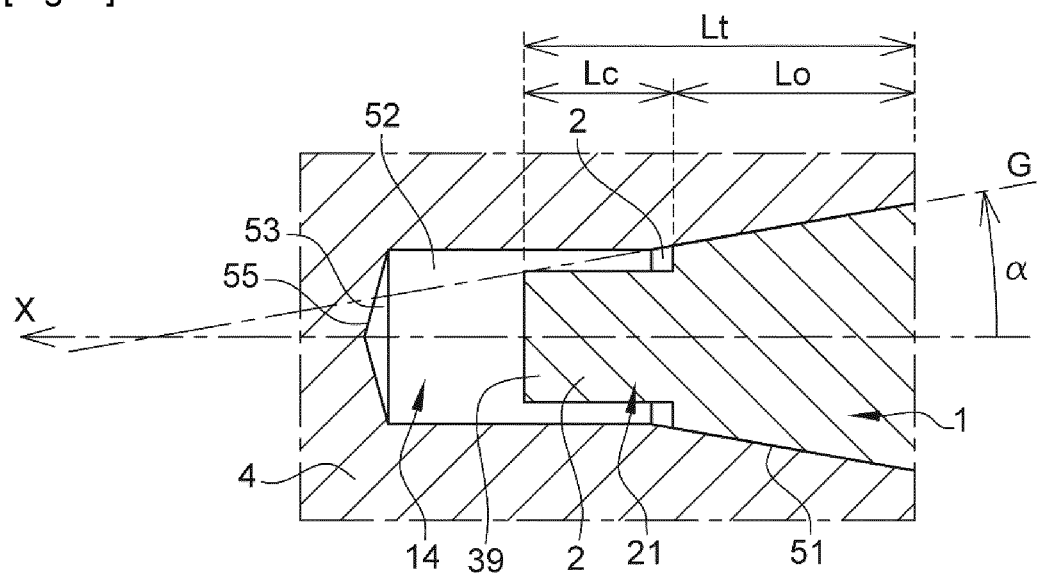

[Fig. 5]
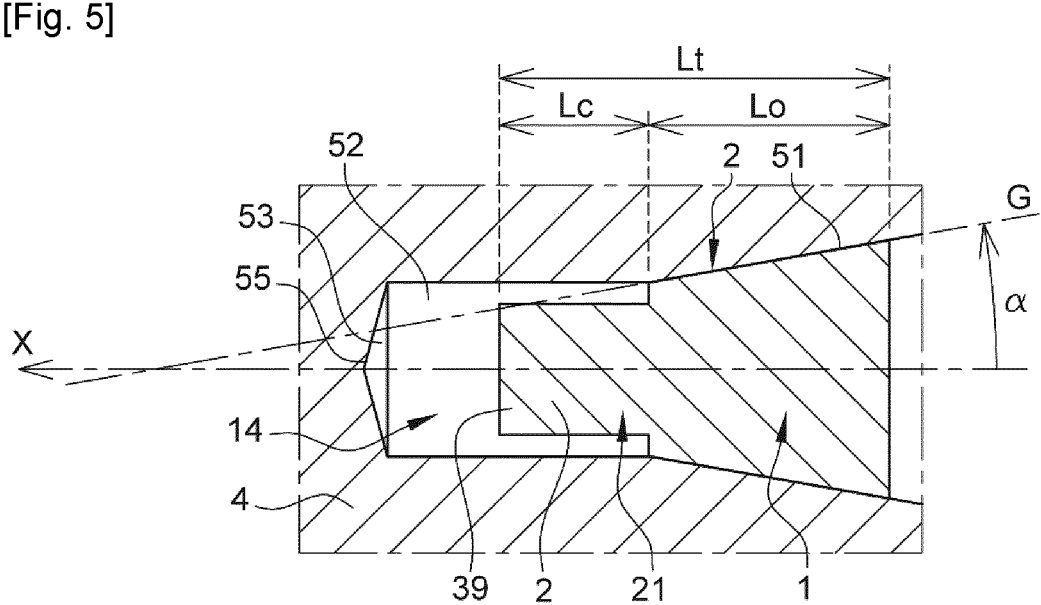

[Fig. 6]
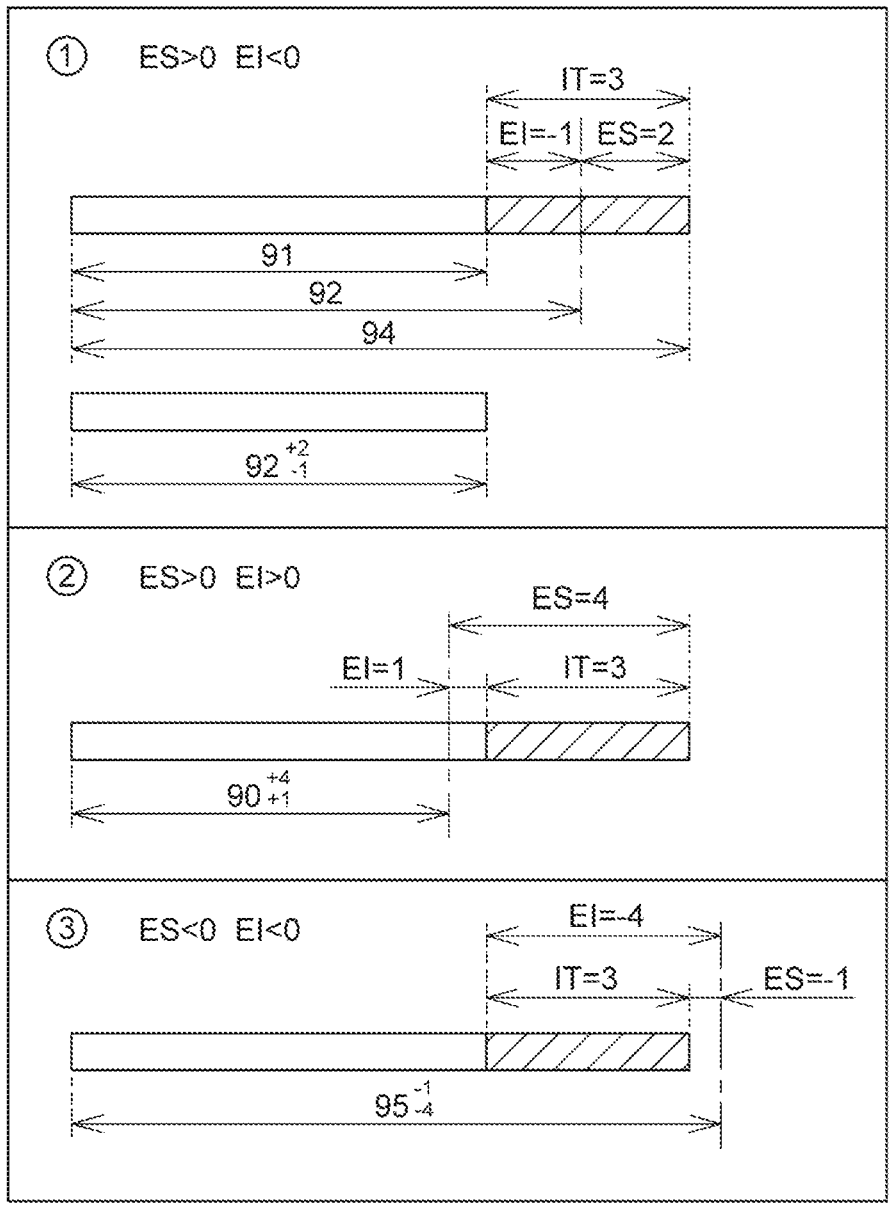
[Fig. 7]
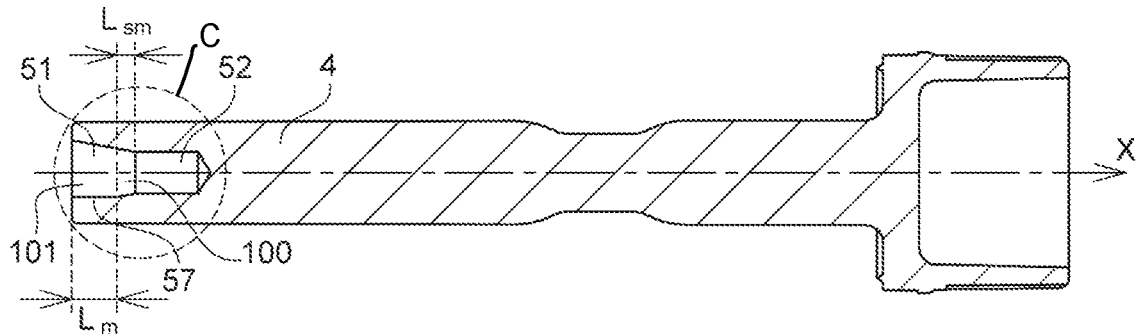

[Fig. 8]
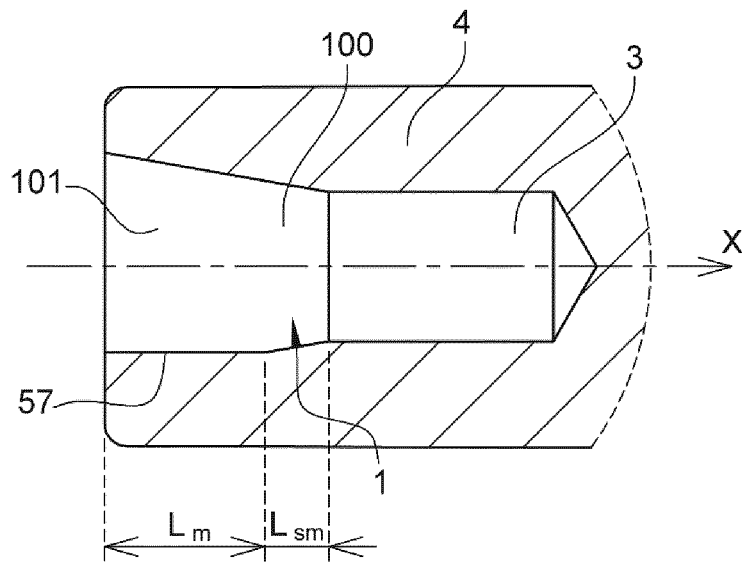
[Fig. 9]
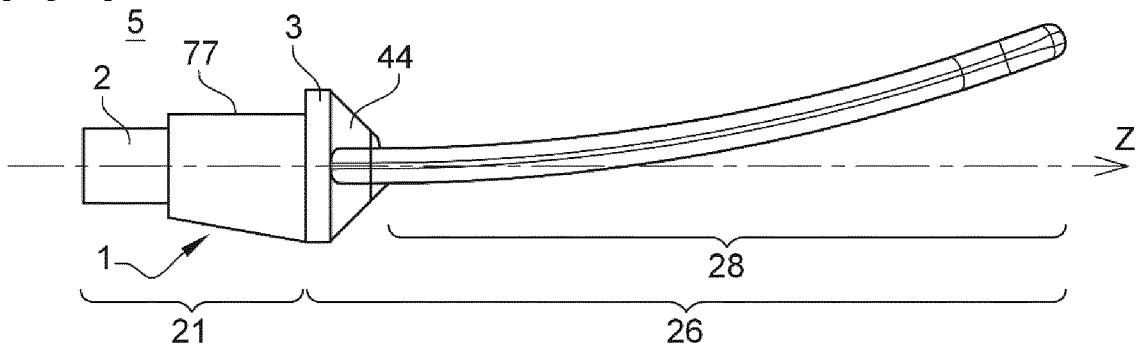
[Fig. 10]
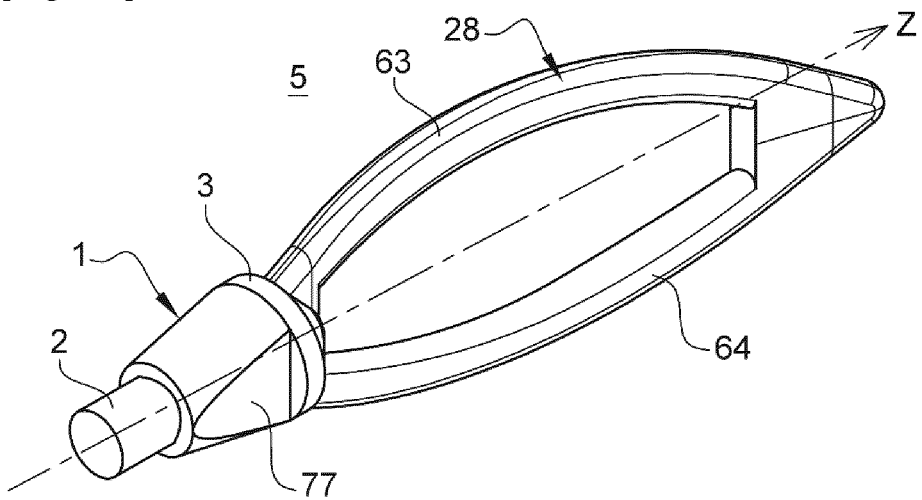

[Fig. 11]
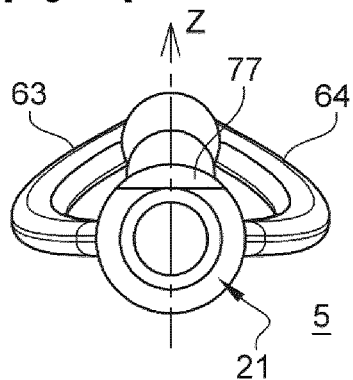
[Fig. 12]
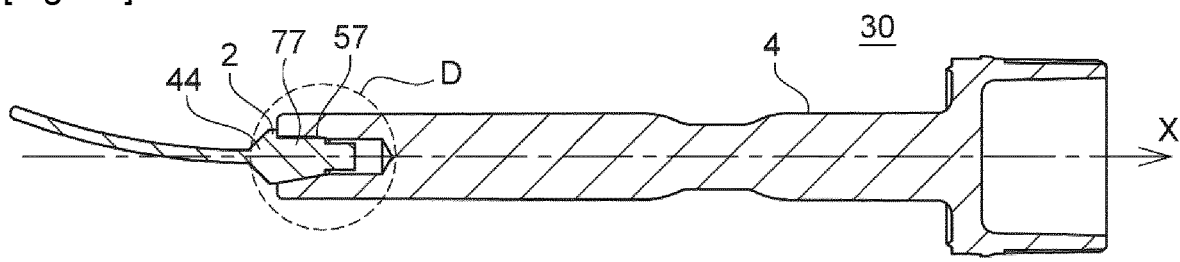
[Fig. 13]
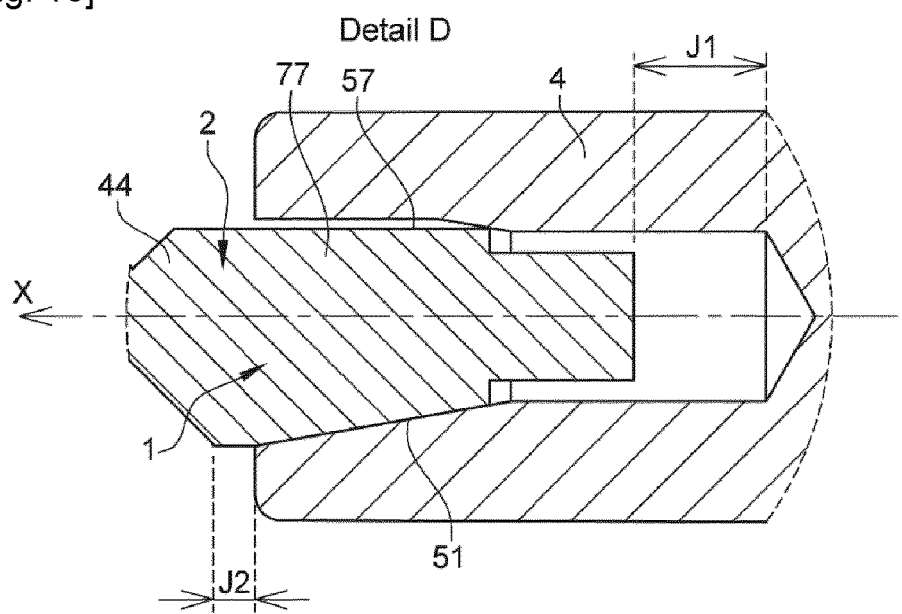

APPLICATOR END PIECE HAVING A FRUSTOCONICAL PROFILE

The present invention relates to applicators for cosmetic products, having a stem and a cosmetic application element with a frustoconical end piece at one end of the stem.

It also relates to a method for assembling, a cosmetic application element with a frustoconical end piece on a stem, in particular using a laser, and to the cosmetic applicators that are able to be obtained using this method. The applicator may be for example an applicator for a makeup or care product, for example a lipstick, a lip gloss, a concealer, a foundation or an eyeshadow.

The product may be liquid, being for example intended to be applied to the lips, the skin or appendages. The product may also be solid, semi-solid or pulverulent, being for example in the form of a block, which is intended or not intended to be moistened in order to be taken up.

More generally, a cosmetic product is a product as defined in Regulation (EC) No 1223/2009 of the European Parliament and of the Council dated Nov. 30, 2009 relating to cosmetic products.

TECHNOLOGICAL BACKGROUND

An application element can be fastened to a stem in various ways and the application element may in particular have a fastening end piece fitted in the stem. In this case, the fastening end piece is inserted into an open housing at the end of the stem.

Various forms of end pieces have already been proposed.

The "standard" and "standard oriented" forms of end pieces are the most well-known forms of end pieces having a cylindrical profile. For this type of end piece, play is always necessary for the introduction of the applicator into the stem, but this play is detrimental to assembly, in particular to welding. The play is located mainly between the stem and the generatrices of the cylinder that are parallel to the longitudinal axis of the stem. This is "lateral play" with respect to the longitudinal axis of the stem. The contact between the stem and the end piece is not fully ensured since play remains between these two components, generally being between 0.01 mm and 0.14 mm. This play will not allow the entire surface to be assembled with the stem, in particular welded thereto, and this will cause significant dispersion of integrity and weaken the assembly.

KR 20180128321 A discloses, in FIG. 1 thereof, an application element having a fastening end piece, the envelope surface of which mostly has a cylindrical portion. This cylindrical portion is extended, in the direction of the proximal end thereof, by a relatively short radiused portion directed toward the end wall of the housing of the stem. This assembly structure is also disclosed in CN109475218, in FIG. 1, or in JP2006296824, in FIG. 2.

The end pieces having a cylindrical profile with a radiused end as disclosed in these two documents have the same drawbacks as the end pieces of standard or standard oriented form during the assembly thereof with a stem. For these end pieces, too, there is significant lateral play between the end piece and the stem on account of the cylindrical portion, which has a negative effect on the quality of the assembly.

US 2011/0211902 discloses an applicator comprising a gripping part connected to a first end of a handle. At its second end, the handle has a housing that is able to receive the end piece of an application element, the head of which forms a liner with a thumb wheel. In FIG. 1, the housing of the handle has a frustoconical form, as does the fastening end piece. The description does not discuss this frustoconical form. Furthermore, it is apparent from FIG. 1 that there is a space between the end piece and the handle, this suggesting that the play between the two components needs to be relatively large. It can also be seen that this space is strictly the same both between the generatrices of the cone frustum and the stem and between the proximal end of the cone frustum and the end wall of the housing. According to that document, there would be the same axial and lateral play between the stem and the end piece. Lastly, the description is silent about the way in which the handle and the gripping part are assembled and about the dimensions of these components and of the housing.

U.S. Pat. No. 7,476,045 discloses cosmetic applicator stems at the end of which there are disposed application elements which may be hairbrushes, brushes, foam components or other components made of plastic with application properties specifically adapted to the cosmetic in question in each case. The applicator stem is suitable for the manufacture of long and thick stems at low cost by virtue of having an internal void that extends along the longitudinal axis of the stem, in addition to the housing provided for retaining the application element. The form of this housing is not mentioned in the description.

There is a need to provide applicators that exhibit less play between the end piece of the application element and the stem.

There is a need to provide applicators for improving the precision of makeup application, such as the thickness of the lines.

There is a need to provide applicators in which the risks of detachment or separation of the application element and the stem are reduced.

There is a need to provide applicators in which the assembly between the application element and the stem is sealed.

Currently, application elements are attached mechanically to a stem by crimping, snap-fastening, adhesive bonding or thermal welding, in particular using hot jaws.

Crimping is frequently used: one end of an application element is fastened in a housing of a rigid part of the stem by deformation of the wall of the housing, generally by radial clamping.

However, this process leaves unattractive tooling marks on the device. Moreover, it cannot be implemented effectively for the assembly of an application element with a stem if the hardness of one of the two is low, in particular less than 90 Shore A.

There is a need to provide a cosmetic applicator having a cosmetic application element connected to a stem, which does not bear tooling marks, regardless of the constituent materials thereof and their chemical or physical properties, in particular regardless of their hardnesses.

Moreover, these applicators need to be able to be manufactured in an acceptable time for mass production, without deterioration, distortion or other unacceptable effect for the consumer. Their production cost should also be acceptable.

DEFINITION OF THE INVENTION

The invention relates to a device for packaging and applying a cosmetic product, of longitudinal axis X, this device having a container for containing said product and a stem connected by a first end to a gripping part and by a second end to an application element comprising an application head and an end piece mounted in a housing of the stem, the end piece having a frustoconical portion fitted in a complementary frustoconical space provided in the housing of the stem.

There is little if any play between the external surface of the end piece defining the frustoconical portion and the internal surface of the stem defining the frustoconical space of the housing. The play is zero or virtually zero: the two surfaces are in contact in a sure and reliable manner in order in particular to carry out welding between the two components.

According to the invention, the frustoconical portions come into contact without clamping. There is a lack of play, or almost a lack of play, without clamping.

In the case of a conical assembly, the forms still fit together without play and without clamping, the cone providing this advantage. The dimensional difference has an effect on the depth of insertion.

Preferably, according to the invention, the play between the external surface of the end piece defining the frustoconical portion and the internal surface of the stem defining the frustoconical space of the housing is in the range [x, 0], where x=−0.05 and even more preferably x=−0.01.

The frustoconical portion is associated with welding and with the fact that play is necessary for assembly, this play being "compensated" by the two frustoconical portions of the end piece and of the housing that come into contact.

By virtue of the complementary conical forms of the end piece and of the housing, the stem and the application element are in contact in a sure manner, with less play than if they had complementary cylindrical forms. As a result, the integrity of the assembly is improved compared with a cylindrical assembly. The assembly is more secure, more reliable and more durable.

Moreover, the frustoconical form affords better centering of the end piece in the housing, in order for the end piece to be positioned reliably on the longitudinal axis of the stem. By contrast, since a cylindrical form of the assembly creates play, the application element can be offset to one side of the axis or the other. This frustoconical shape affords precision, the application element being perfectly centered with respect to the axis of the stem.

In addition, the frustoconical form is associated with wedging depending on the coefficient of friction of the materials, for better contact before welding. This wedging does not exist for a cylindrical form, which is only associated with clamping or play.

The application element/stem assembly is stressed especially on passing through a wiper, if one exists in the device. In this case, the assembly according to the invention withstands this stress by virtue of the frustoconical portions of the end piece and of the housing.

The invention also relates to a method for manufacturing a device as defined above, comprising the operations of (i) manufacturing an application element having an end piece that has a frustoconical portion; (ii) manufacturing a stem provided with a housing comprising a frustoconical space with a form complementary to the frustoconical portion of the end piece; (iii) assembling the application element and the stem by fitting the fastening end piece in the housing; (iv) securing the application element and the stem together in particular by crimping, snap-fastening, adhesive bonding or thermal welding, preferably using a laser beam.

By virtue of the invention, the stem and the application element can be laser welded over the entire external surface of the frustoconical portion. Contact between the two surfaces is ensured. There is no dispersion of integrity and the assembly is stronger and more robust. The laser leaves no assembly marks, unlike crimping. As a result, the appearance of the device is improved. In addition, the method according to the invention does not use glue, which, in contact with the formulation, can modify the properties of the latter.

Advantageously, rotary friction welding is implemented to manufacture the device according to the invention.

The invention also relates to a device for packaging and applying a cosmetic product, of longitudinal axis X, which is able to be obtained by way of the method indicated above.

MAIN DEFINITIONS

A "cross section of a component of axis X" is a section perpendicular to the axis X of the component.

The "longitudinal axis of a component" denotes the line connecting all of the centers of mass of the cross sections of a component.

A "conical portion" means a cone of revolution.

A "frustoconical portion" means a portion of which the envelope surface is included in a cone frustum, and preferably a portion of which the envelope surface is a cone frustum.

The "total length of the fastening end piece" is the length of the application element intended to be inserted into a housing of the stem. A covering of the fastening end piece is considered, according to the invention, to be an added component on the fastening end piece. In this regard, it is not taken into consideration for determining the length of the end piece, this being determined without any covering.

According to the invention, "the application head is integral with a fastening end piece" but the application head can be covered with a coating having one or more layers, such as a varnish, paint or flocking.

The "application end piece" is defined as being the part of the application element that is received in the housing of the stem.

The "application head" is defined as being the part of the application element that is located outside the housing of the stem.

The "form of the application head" means the part of the application head that is used for makeup application.

The "method for rotary friction welding" is generally divided into four phases:

Initial friction phase: a component is set in rotation. At the same time, the other component is pressed against it, while exerting a defined pressure.

Friction phase: the relative movement (rotation) and the regular pressure heat up the surfaces in contact.

Forging phase: the rotation is stopped and the pressure is increased further. The plasticized material can thus be joined to the other component.

Maintaining phase: the two materials are maintained under high pressure and can subsequently cool slowly.

Application Element

The application element may have an envelope surface that does or does not exhibit symmetry of revolution. The application element may have a symmetric form relative to a median plane, in particular a median plane containing the longitudinal axis of the support stem. The latter may be connected, at the opposite end from the one bearing the application element, to a closure cap for the container.

Starting from the stem, to which the application element is connected, the width of the application element may increase and then decrease in the direction of the distal end of the application element or vice versa, or be constant.

The width of the application head may be greater, at at least one point along its length, or along more than a quarter or half of its length, than the diameter of the stem. The application element may have at least one longitudinal side that is offset laterally toward the outside relative to the stem.

The application element 5 may extend laterally beyond the stem, whether because its width exceeds that of the stem and/or because of the direction in which it extends.

The distance by which the application element extends beyond the stem may correspond for example to the length of the flocking bristles or be greater.

The Stem

The stem may have an outside diameter greater than or equal to 2.5 mm, better still greater than or equal to 3 mm, in particular around 4 mm to 7 mm, this giving it a degree of rigidity and being able to increase the precision of makeup application.

Preferably, the longitudinal axis of the application element is substantially coaxial with that of the stem that bears the application element.

Product to be Applied

For high-viscosity compositions, the viscosity, measured at 25° C. and under atmospheric pressure, may be advantageously greater than or equal to 4.5 Pa·s at a shear rate of 200 $s^{-1}$ and less than or equal to 50 Pa·s (using a Brookfield Rheomat RM 180 viscometer equipped with a No. 4 spindle, the measurement being effected after 10 minutes of rotation of the spindle in order to stabilize the rotational speed and the viscosity). For mascaras, the composition advantageously has a viscosity, measured under these conditions at 25° C., at a shear rate of 200 $s^{-1}$, ranging from 4 Pa·s to 18 Pa·s.

For more fluid compositions, such as glosses or lip stains, the viscosity may advantageously be less than 4.5 Pa·s, for example between 1 mPa·s (or 1 cps) and 4.5 Pa·s at a rate shear rate of 200 $s^{-1}$ (using a Brookfield Rheomat RM 180 viscometer equipped with a No. 4 spindle, the measurement being effected after 10 minutes of rotation of the spindle in order to stabilize the rotational speed and the viscosity).

PREFERRED EMBODIMENTS

Preferably, the application element according to the invention has one or more of the following features, taken alone or in combination:

The frustoconical portion defines an exterior surface that comes fully into contact with an internal surface of the stem defining the complementary frustoconical space. In other words, the play is zero or virtually zero between the internal surface of the stem and the exterior surface of the frustoconical portion.

A proximal end of the end piece is at a distance from an end wall of the housing of the stem, in order to ensure play between the end piece and the end wall of the housing.

The form of the application head is at a distance from a distal end of the stem, in order to ensure play between the stem and the form of the application head.

The frustoconical portion has an elongate flat along the longitudinal axis X of the device.

The stem and the application element have hardnesses less than 90 Shore A, the stem preferably not having any outward sign of assembly with the application element.

The frustoconical portion defines a small base joined to a first cylindrical portion.

The frustoconical portion is defined by a generatrix G that makes an angle α with the longitudinal axis X of the applicator, the angle α being between 5° and 20°, preferably between 7° and 15°, and more preferably between 8° and 12°, and even more preferably 10°.

The application element is formed in one piece, preferably from injection-molded material.

The stem has one or more voids or is hollow.

The container and the applicator are separated from one another when the device is being used.

DESCRIPTION OF THE FIGURES

Further features and advantages of the invention will become apparent from reading the following detailed description of nonlimiting implementation examples thereof and from examining the appended, schematic and partial, drawing, in which:

FIG. 1 is a view in longitudinal section of one embodiment of an applicator according to the invention, FIG. 2 is a view of the detail B in FIG. 1, FIG. 3 is a view in longitudinal section of an end piece according to the invention, the "female cone" of the stem being at its minimum tolerance and the "male cone" of the application element at its maximum tolerance, FIG. 4 is a view in longitudinal section of an end piece according to the invention, the "female cone" of the stem being at its nominal and the "male cone" of the application element being at its nominal, FIG. 5 is a view in longitudinal section of an end piece according to the invention, the "female cone" of the stem being at its maximum tolerance and the "male cone" of the application element at its minimum tolerance, FIG. 6 explains various theoretical adjustment cases, FIG. 7 is a view in longitudinal section of a second embodiment of a stem for an application element, with a "female cone" provided to receive an oriented conical end piece, FIG. 8 is a view of the detail C in FIG. 7, FIG. 9 is a side view of an application element having an oriented conical end piece, FIG. 10 is an inclined perspective view of the application element in FIG. 9.

FIG. 11 is a rear view of the applicator in FIG. 10,

FIG. 12 is a view in longitudinal section of the embodiment of an applicator according to the invention having an oriented conical stem, FIG. 13 is a view of the detail D in FIG. 12.

FIG. 1 shows an applicator 30 of longitudinal axis X, which can be screwed onto a container and is separable from the container when used. The container contains a composition, which is for example a product intended to be applied to the nails, such as a nail varnish. The invention is not limited to a particular cosmetic composition, and the composition may for example be a product intended to be applied to other keratin materials, for example the skin or the lips.

In the example shown, the application element 5 comprises the male frustoconical portion and the stem 4 comprises the female frustoconical portion, but the opposite may be the case.

The applicator 30 comprises a stem 4 and an application element 5.

The application element 5 comprises an application head 26 and a fastening end piece 21.

In the example shown, the longitudinal axis X of the application element 5, of the stem 4 and of the applicator 30 are identical, the longitudinal axis of the applicator not being shown as a result.

The applicator 30 comprises a stem of axis X that bears an application element 5 at one end and is connected at its other end to a gripping member, which also constitutes, in the example in question, a member for closing the container. In a variant that is illustrated, the gripping member and the stem 4 are made in one piece by molding plastics material.

The stem 4 has a distal portion 13 provided on the inside with a housing 14, which can be seen in FIGS. 1 to 5, and a proximal portion 16 having a tubular skirt 18, which serves for fastening in the gripping member. Between the proximal portion 16 and distal portion 13, the stem 4 has a solid intermediate portion 22 that is substantially deformed when the applicator 30 is being used. The largest transverse dimension D of the stem 4 at the top of the intermediate portion 22 is for example greater than or equal to 5 mm, and is for example around 7 mm in the example in question. The stem 4 may be made in one piece, in particular by molding.

The application head 26 is constituted by two lateral arms 63, 64 and a central arm 65, which form, between one another, cavities 16, 17 that are situated in the continuation of the stem 4. The arms are connected to a second cylindrical portion 3, which also belongs to the application head 26. However, the applicator 30 could have any other form, being, for example, a comb, a spatula or an inclined tip. The application element 5 may be molded in one piece, which is produced for example by injection molding, or two-shot injection molding, and optionally flocked.

At least one of the arms 63, 64 may have a flocked coating along at least half of its length, for example, better still along its entire length.

The form of the application element may depend in particular on the region of the body or face to which the product is intended to be applied.

As shown in FIG. 2, the application element 5 has a proximal end 39 cooperating with the end wall of the housing 14 of the stem 4. The end piece 21 has a frustoconical portion 1 that is connected by its small base to a first cylindrical portion 2. By its large base, it is connected to the second cylindrical portion 3. The first cylindrical portion 2 is situated inside the housing 14. The second cylindrical portion 3 is situated outside the housing 14.

In the example shown, the frustoconical portion 1 converges away from the application element, with a generatrix G that makes an angle α substantially equal to 10° with the longitudinal axis X.

The form of the end piece 21 is at least partially complementary to the form of a housing 14 of the stem into which it is inserted.

The frustoconical space 51 of the housing 14 is extended, by its small base, toward a cylindrical space 52 having a diameter larger than the diameter of the first cylindrical portion 2 of the end piece 21.

The cylindrical space 52 is continued by a conical space 53 of longitudinal axis X delimiting the end wall 55 of the housing. The play at the end wall of the housing is ensured by the space 31. There is still enough play to be sure that there will never be contact between the end wall of the housing and the proximal end of the end piece. The cylindrical portion 52 does not interfere with the stem 4. The axial play at the end wall of the housing is denoted "J2" in FIG. 2.

The second cylindrical portion 3 ensures that the form 28 of the application head 26 does not come into contact with the distal end of the stem 3. In other words, the form 28 is away from the distal end of the stem 3. In FIG. 2, the form 28 of the application head 26 comprises the arms 63, 64, 65 and the cavities 16, 17, but the form 28 could be quite different. The axial play between the distal end of the stem 4 and the form 28 of the application head is denoted "J1" in FIG. 2.

During laser welding, the stem 4 and the application element 5 are static with respect to one another but the whole rotates on itself, or the laser rotates about them, or the components are static with respect to one another and rotate at the same time as the laser rotates about them, in order to effect welding around the entire perimeter or not, as desired.

The stem 4 and the application element 5 may be made of plastics material, for example chosen from polypropylenes, polyethylenes, polyamides, acetal resins, polyesters, polyester-based resins and thermoplastic elastomers (TPE). They may be entirely flexible, being made for example from an elastomer, for example EPDM, silicone or latex, this list not being limiting.

In the example shown in FIGS. 3 to 5, the frustoconical portion 1 extends along a length $L_0$ equal to more than a quarter of the total length $L_t$ of the fastening end piece 21, $L_c$ being the length of the first cylindrical part 2, but this does not have to be the case. The frustoconical portion 1 may for example extend along a fifth or a sixth of the total length of the end piece 21.

The frustoconical portion 1 makes it possible to take up the tolerances of the two components in order that they are always in contact with one another and thus a higher quality and therefore stronger weld can be made.

The angle α of 10° is preferred so as to take up a maximum tolerance between the components and avoid the application element 5 being inserted too far or too little into the stem 4. It was by calculating the vertical movement depending on the minimum and maximum tolerances of the stem 4 and of the application element 5 that the angle of 10° appeared appropriate. If the tolerances are changed, the angle α is also modified, for example it may be equal to 12°, 15° or 5° or the like.

The tolerances of the "female cone" (frustoconical space 51 of the housing 14) and of the "male cone" (frustoconical portion 1 of the end piece 21) determine the value of the optimal angle α.

FIGS. 3 to 5 explain different tolerances that may be present (chain of dimensions). They show that the particular form of the end piece and of the stem results, in all insertion cases:
 in total lateral contact between the end piece 21 and the stem 4 by virtue of the complementary frustoconical surfaces,
 in the lack of axial contact between the stem 4 and the end piece 21, by virtue of the cylindrical space 52 provided in the end wall 55 of the housing.

In FIG. 3, the diameter of the large base of the frustoconical portion 1 (or nominal) is 3.15 mm: the diameter of the large base of the frustoconical space 51 of the housing 14 (forming an orifice) is 3.02 mm. A part of the frustoconical portion 1 is situated outside the housing 14 of the stem 4 along a length measured along the longitudinal axis X equal to 0.37 mm. The cylindrical portion 2 of the end piece 21 extends in the cylindrical space 52 and in the frustoconical space 51. Since the end of the end piece 21 is not in contact with the end wall of the housing 55 of the stem 4, axial play is provided between the stem 4 and the end piece 21 at the end wall 55 of the housing. By contrast, there is no lateral play between the frustoconical portion 1 and the stem 4: the two components are fully in contact laterally. The end piece 4 has not been fully inserted into the housing of the stem.

In FIG. 4, the diameter of the large base of the frustoconical portion 1 is 3.05 mm, as is that of the large base of the frustoconical space 51. The frustoconical portion 1 is situated entirely inside the frustoconical space 51. As in FIG. 4, there is axial play between the end wall of the housing 55 and the end of the end piece. By contrast, there is no lateral play between the frustoconical portion 1 and the stem 4: the two components are fully in contact laterally. The end piece 4 has been inserted further (diameter of the end piece equal to the diameter of the orifice) into the frustoconical space than in FIG. 3 (diameter of the end piece greater than the diameter of the orifice) but has been inserted less than in FIG. 5 (diameter of the end piece equal to the diameter of the orifice).

In FIG. 5, the diameter of the large base of the frustoconical portion 1 is 2.95 mm; the diameter of the large base of the frustoconical space 51 of the housing 14 is 3.08 mm. The frustoconical portion 1 is situated entirely inside the frustoconical space 51. There is axial play but no lateral play.

The application elements 5 will be inserted to a greater or lesser extent into the housing 14 because the tolerances will vary. By virtue of the frustoconical portion 1, it becomes possible to take up the dimensional tolerances and still be in contact with the frustoconical wall of the stem 4, for reliable welding.

FIG. 6 explains the concepts of tolerance dimensioning and adjustments in connection with the explanations below.

Interchangeability

If a set of identical objects needs to be manufactured, it is impossible for one and the same form to always have exactly the same dimensions from one object to another.

An imposed dimension will be easier to realize if it can vary between two limit values: a maximum dimension and a minimum dimension.

The difference between the two is known as the tolerance, or tolerance range.

The greater the precision required, the smaller the tolerance range has to be.

The interchangeability of the objects or components is the basis of all series-manufactured products. Any interchangeable component of a mechanism can be removed and fitted back on any other mechanism of the same type.

Toleranced Dimensioning

Nominal dimension: Dimension that serves as a reference for identification and notation on the drawings.

Tolerance or tolerance range: Permitted (tolerated, admissible) variation of the actual dimension of the component.

Greatest deviation ($E_S$): this is equal to the difference between the maximum admission dimension and the nominal dimension. $ES=d_{max}-d_{nominal}$.

Smallest deviation ($E_I$): This is equal to the difference between the minimum admissible dimension and the nominal dimension. $EI=d_{min}-d_{nominal}$.

Tolerance Range (IT)

The end piece 21 and the stem 4 can be secured together by using a device for fastening the stem and the application element 5 by laser welding, the device having:
- a support for positioning the pre-assembled stem 4 and application element 5,
- a laser beam, in particular an optical fiber that has a wavelength of around 1.940 μm, having a power of between 40 W and 100 W, and is coupled to a collimating lens in order to obtain a spot with a diameter of between 1 mm and 1.5 mm,
- optionally, a numerically controlled machine for moving the laser beam with respect to the support.

The fastening device may comprise components for immobilizing the pre-assembled stem and application element 5 and a programmable controller for controlling the activation and energy intensity of the laser beam depending on its position relative to the assembled components.

When the applicator 30 according to the invention is manufactured using a laser, an advantage provided by the invention is that it is possible to fasten two components that are virtually identical both in terms of their plastics composition and in terms of their color, including materials that are optically translucent in the visible range.

Another advantage resides in the lack of clamping marks between the application element 5 and the stem 4.

Advantageously, the laser operates in a static welding mode covering an entire contact zone between the frustoconical portion 1 of the end piece 21 and the frustoconical surface of the stem 4.

Preferably, the method for manufacturing an applicator according to the invention comprises an operation consisting in (v) exposing the end of the stem 4 into which the end piece 21 has been fitted to a laser beam with a diameter of between 0.2 micrometer and one micrometer.

More preferably, it comprises the operation of (v) exposing the end of the stem 4 into which the end piece 21 has been fitted to a laser beam with a wavelength of between 3 micrometers and 6 micrometers.

Laser welding makes it possible to have a sealed applicator/stem connection, it also being possible to make a hollow stem 4 in order to reduce its weight and then close it by virtue of the application element 5 assembled by welding. For some applications and in particular for environmental friendliness, a hollow stem may prove to be particularly advantageous.

FIGS. 7 to 13 show embodiments similar to those in FIGS. 1 to 6, except that the housing of the stem is provided to receive an application element with an "oriented conical" end piece. Only the differences provided by these FIGS. 7 to 13 will be discussed below.

As can be seen in FIGS. 9 to 11, the end piece 21 of the application element 5 has a frustoconical portion 1 provided with a flat 77 parallel to the longitudinal axis Z of the end piece. The flat 77 is constructed such that its surface comes into direct contact with the housing 14 of the stem 4, while making the positioning and retention of the application element 5 in the housing 14 easier.

The flat 77 avoids the piston effect during the insertion of the end piece 21 into the housing 14. Ultimately, it prevents the rotation of the end piece 21 once it is positioned in the housing 14.

It should be noted that the frustoconical portion 1 may have not one flat 77 but two (or more), which are in particular parallel to the longitudinal axis Z of the end piece and are or are not the same width.

In FIGS. 9 to 11, the flat 77 extends along the entire length of the frustoconical portion 1 of the end piece 21, but this does not have to be the case.

At its distal end, the frustoconical portion 1 is separated from the form 28 of the application element 5 by a second cylindrical portion 3 forming a collar intended to be positioned outside the housing 14, in order to ensure the "play 2" between the form 28 of the application element 5 and the stem 4.

In the particular case of the application element 5 shown in FIGS. 9 to 11, the second cylindrical portion 3 is continued by a second frustoconical portion 44 that converges in the direction of the distal end of the application head 26. It houses lateral arms 63, 64 that define the form 28 of the application head 26.

In FIGS. 12 and 13, the end piece 21 has been inserted into its housing 14. The housing 14 comprises in particular a frustoconical internal surface having a flat part forming a second flat 57 with a form complementary to that of the first flat 77 of the end piece 21. The frustoconical internal surface having a flat defines the frustoconical space 51 having a flat. The flat 57 of the housing 14 is positioned facing the flat 77 of the frustoconical portion of the end piece 21 once the application element has been mounted in the stem 4.

Preferably, the flat 77 has an elongate profile when it is viewed along the longitudinal axis X of the applicator 30.

In order to produce the applicator 30 according to the invention, the application element 5 is positioned relative to the stem 4 such that the flat 77 of the end piece 21 can be disposed facing the corresponding flat 57 of the housing 14 during the introduction of the application element 5 into the stem 4. The end piece 21 is then introduced into the housing 14 by frictional sliding until the frustoconical portion 1 is positioned entirely in the frustoconical space 51.

In FIGS. 7 and 8, in the housing 14, the surface forming the flat 57 extends, along the longitudinal axis X of the stem 4, along a length $L_m$ of the frustoconical space 51 and forms a frustoconical space with a flat 101. A frustoconical space 100, without a flat, with a length $L_{sm}$, referenced 101, is provided between the frustoconical space 51 with a flat and the cylindrical space 52.

The length $L_m$ of the frustoconical space with a flat 101 is, preferably, greater than the length $L_{sm}$ of the frustoconical space without a flat 100.

The invention is not limited to the examples described. It encompasses for example other conical assembly forms and other devices for fastening by laser welding.

The invention claimed is:

1. A device for packaging and applying a cosmetic product, of longitudinal axis X, the device comprising:
   a container for containing said product; and
   a stem connected by a first end to a gripping part and by a second end to an application element, the application element including an application head and an end piece mounted in a housing of the stem,
   wherein the end piece has a frustoconical portion fitted in a complementary frustoconical space provided in the housing of the stem, wherein a length of the frustoconical space is greater than a length of the frustoconical portion,
   wherein an outer surface of the frustoconical portion has an elongate first flat along the longitudinal axis X of the device, and
   wherein an inner surface of the housing of the stem has a second flat disposed in a position facing the first flat of the frustoconical portion, wherein the stem and the application element are welded to each other.

2. The device as claimed in claim 1, wherein the frustoconical portion defines an exterior surface that comes fully into contact with an internal surface of the stem defining the complementary frustoconical space.

3. The device as claimed in claim 1, wherein a proximal end of the end piece is at a distance from an end wall of the housing of the stem.

4. The device as claimed in claim 1, wherein the application head is at a distance from a distal end of the stem.

5. The device as claimed in claim 1, wherein the stem and the application element have hardnesses less than 90 Shore A, the stem not having any outward sign of assembly with the application element.

6. The device as claimed in claim 1, wherein the frustoconical portion defines a small base joined to a first cylindrical portion.

7. The device as claimed in claim 1, wherein the frustoconical portion is defined by a generatrix that makes an angle ($\alpha$) with the longitudinal axis of the applicator, the angle $\alpha$ being between 5° and 20°.

8. The device as claimed in claim 1, wherein the application element is formed in one piece.

9. The device as claimed in claim 1, wherein the stem has one or more voids or is hollow.

10. The device as claimed in claim 1, wherein the container and the applicator are separated from one another when the device is being used.

11. A method for manufacturing a device as defined in claim 1, the method comprising:
    manufacturing the application element having the end piece that has the frustoconical portion;
    manufacturing the stem provided with the housing comprising the frustoconical space with a form complementary to the frustoconical portion of the end piece;
    assembling the application element and the stem by fitting the fastening end piece in the housing; and
    securing the application element and the stem together by using a laser beam.

12. A device for packaging and applying a cosmetic product, of longitudinal axis X, which is able to be obtained by way of the method in accordance with claim 11.

* * * * *